United States Patent Office 3,505,380
Patented Apr. 7, 1970

3,505,380
CYCLIC SILANE ESTERS AND METHODS FOR MAKING THEM
Abe Berger, Schenectady, N.Y., assignor to General Electric Company, a corporation of New York
No Drawing. Filed Dec. 22, 1966, Ser. No. 603,736
Int. Cl. C07f 7/04, 7/18; C07d 103/04
U.S. Cl. 260—448.8
2 Claims

ABSTRACT OF THE DISCLOSURE

Heterocyclic organosilicon compounds of the formula,

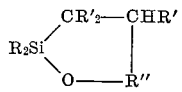

are made by adding an active hydrogen-containing silane to an olefinically unsaturated hydroxy-containing thioether or hydroxy-containing ether, where R is a monovalent radical free of aliphatic unsaturation, R' is hydrogen or an R radical, and R'' is an alkyleneoxyalkylene or an alkylenethioalkylene radical. The compositions are useful in making silicone organic block copolymers of improved hydrolytic stability useful in the manufacture of polyurethane foams.

---

The present invention relates to certain cyclic silane esters and to methods for making them.

Prior to the present invention, methods were available for making various heterocyclic organosilicon compounds of the formula,

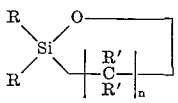

such as 2,2-dimethyl-1-oxa-2-silacylopentane, where R is a monovalent radical free of aliphatic unsaturation, and selected from hydrocarbon radicals and halogenated hydrocarbon radicals, R' is selected from hydrogen and R radicals, and $n$ is an integer.

These heterocyclic organosilicon compounds can be utilized in a variety of applications. For example, they can provide for organopolysiloxanes having terminal triorganosiloxy units such as

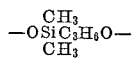

units, which can be chemically combined with organic blocks through carbon-oxygen-carbon linkages. Among the advantages achieved with such block copolymers, are improved hydrolytic stability, since they are free of silicon-oxygen-carbon linkages.

Knoth Patent 2,983,744 for example, shows a method for making 2,2-dimethyl-1-oxa-2-silacyclopentane by effecting reaction between dimethyldichlorosilane and trimethylene-chlorohydrin to provide for the production of the intermediate 3-chloropropyldimethylchlorosilane. This intermediate is then cyclized by the use of metallic sodium. Although the method of Knoth can be utilized to make various heterocyclic organosilicon compounds, experience has shown that the employment of metallic sodium results in extremely low yields of desired products. Anderson Patent 3,083,219 assigned to the same assignee as the present invention can be employed to make a variety of heterocyclic organosilicon materials utilizing tetrahydrofuran. However, even though the method of Anderson provides for significantly improved yields of product as compared to other prior art methods, it is limited to the production of heterocyclic organosilicon materials made by the intercondensation of tetrahydrofuran with various organohalosilanes.

The present invention is based on the discovery that a wide variety of heterocyclic organosilicon compounds can be made by methods involving either hydrosilation of certain olefinically unsaturated organosilicon compounds, or the free radical addition of certain hydroxy organothiols to olefinically unsaturated alkoxy silanes. For example, heterocyclic organosilicon compounds which can be made by what will be referred to hereinafter as the "hydrosilation method" are compounds of the formula, (1)
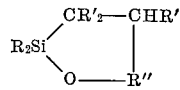

where R and R' are as previously defined, and R'' is a divalent organic radical selected from alkylene radicals, alkyleneoxyalkylene, and alkylenethioalkylene radicals.

There are also included by the present invention, heterocyclic organosilicon compounds of the formula, (2)
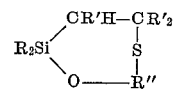

which can be made by what will be referred to hereinafter as "the free radical method," where R, R' and R'' are as defined above.

Radicals included by R of Formula 1 are for example, alkyl radicals such methyl, ethyl, propyl, butyl, pentyl, hexyl, etc.; aryl radicals such as phenyl, tolyl, xylyl, naphthyl, chlorophenyl; aralky radicals such as phenylethyl, benzyl. Radicals included by R' are for example, hydrogen and all of the aforementioned R radicals. Radicals included by R'' are for example, alkylene radicals, such as methylene, dimethylene, trimethylene, etc.; alkyleneoxyalklene radicals such as methyleneoxyethylene, ethyleneoxyethylene, etc., alkylenethioalkylene such as ethylenethioethylene, etc.

There is provided by the present invention a hydosilation method comprising (1) contacting at a temperature in the range of between 0° C. to 175° C, in the presence of an effective amount of a platinum catalyst, a member selected from, (A) An unsaturated organosilicon material of the formula, (3)
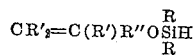

and (B) A mixture of a silicon hydride of the formula, (4)

and an olefinically unsaturated organosilicon material of the formula, (5)        CR'$_2$=C(R')R''OSiR$_3$ and (2) recovering from (1) a heterocyclic organosilicon compound of Formula 1, where R, R', and R'' are as defined above, and X is a halogen radical such as chloro, bromo, fluoro, etc.

Olefinically unsaturated organosilicon materials of Formulae 3 and 5, can be made by contacting in the presence of an acid acceptor, such as an amine, for example, triethylamine, pyridine, etc., an olefinically unsaturated alcohol of the formula, (6)        CR'$_2$=C(R')R''OH and a halosilane selected from , where all of the terms are as previously defined. In instances where hydrosilation is effected between silicon hydride of Formula 4 and olefinically unsaturated organosilicon material of Formula 5, halosilane is separated, as shown by the following equations,

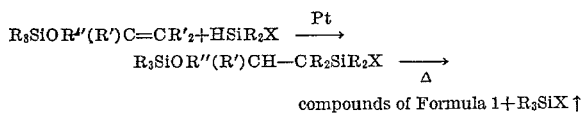

compounds of Formula 1+$R_3SiX \uparrow$

Depending upon the temperature employed during the hydrosilation step, the above reactions can be stepwise or simultaneous.

Heterocyclic organosilicon compounds of Formula 2 can be made by (1) effecting the free radical addition of a hydroxyorganothiol of the formula, (7)  HOR″SH to an unsaturated alkoxysilane of the formula, (8)  $CR'_2{=}CR'SiR_2(OR)$ at temperatures in the range of between 0° C. to 175° C., in the presence of a free radical initiator, and (2) separating from (1) a heterocyclic organocyclic organosilicon compound of Formula 2, where R, R', and R″ are as defined above.

In instances where free radical addition between compounds of Formulae 7 and 8 is effected, an organohydroxy compound of the formula, (9)  ROH can be separated.

Heterocyclic organosilicon compounds included by Formula 1 are for example, 2,2-dimethyl-1,6-dioxa-2-silacyclooctane, 2,2 - methylethyl - 1,6 - dioxa - 2 - silacyclononane, 2,2-diethyl-1,5-dioxa-2-salicycloheptane, 2,2-phenylmethyl - 1 - oxa - 2 - silacyclohexane, 2,2 - dimethyl-1-oxasilacyclopentane, etc.

There are included by heterocyclic organosilicon compounds of Formula 2, for example, 2,2-dimethyl-1-oxa-2-sila - 5 - thiocycloheptane, 2,2 - diethyl - 1 - oxa - 2 - sila-6 - thiocyclooctane, 2,2 - dimethyl - 1 - oxa - 2 - sila - 5-thiocyclooctane, etc.

Olefinically unsaturated alcohols included by Formula 6 are for example, allyloxyethanol, vinyloxyethanol, allyl alcohol, 3-allyloxypropanol, 2-allyloxypropanol, etc. Hydroxyorganothiols of Formula 7 are for example, mercaptoethanol, 3-mercaptopropanol, 2-mercaptopropanol, etc. Organohydroxy compounds of Formula 9 are for example, methanol, ethanol, propanol, etc.

The heterocyclic organosilicon compounds of Formulae 1 and 2 can be utilized as plasticizers in organopolysiloxane elastomeric forming compositions to facilitate milling of filler into the organopolysiloxane gum as well as to minimize the buildup of structure in the resulting filled organopolysiloxane composition prior to cure. In addition, the heterocyclic organosilicon materials of Formulae 1 and 2 can be employed to provde for chain-stopped units for organopolysiloxane polymers which are used to make organopolysiloxane organic copolymers. The heterocyclic organosilicon compounds of Formula 1 for example, can be hydrolyzed to disoloxanes as shown by the following equation,

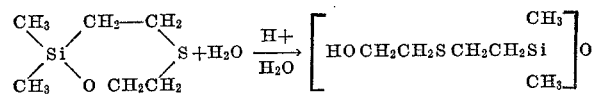

In the practice of the invention, heterocyclic organosilicon compounds included by Formulae 1 and 2 can be made in accordance with the practice of the invention, based on the addition of active hydrogen compounds to olefinically unsaturated compounds at a temperature between 0° C. to 175° C.

Hydrosilation of compounds included by Formulae 3, or 5 can be achieved by contact between olefinic unsaturation and silicon hydride in any desired manner, in the presence of a suitable platinum catalyst. In the event hydrosilation is effected by the use of silicon hydride of Formula 4 in combination with an olefinically unsaturated material of Formula 5, the formation of an adduct can be achieved prior to or simultaneously with separation of halosilane. Although reactant proportions are not critical, it is preferred to employ at least one mole of silicon hydride, per mole of olefinically unsaturated material. However, proportions of either reactant can vary widely without adverse results.

Hydrosilation is preferably effected at temperatures in the range of between 75° C. to 125° C. Platinum catalysts which can be utilized are for example, chloroplatinic acid, olefin complexes such as taught in Ashby Patents 3,159,601, 3,159,662 and Lamoreaux Patent 3,220,972 all of which are assigned to the same assignee as the present invention. The amount of platinum catalyst which can be employed is that amount taught in the aforementioned patents. It is preferred however, to utilize from about 100 parts to 1000 parts of platinum, per million parts of hydrosilation mixture. Free radical initiators which can be employed, are preferably utilized between 75° C. to 125° C., to effect addition of the hydroxy organothiol of Formula 7 to the unsaturated alkoxysilane of Formula 8. For example, there can be employed effective amounts of azo catalysts, and peroxide catalysts, such as from 1% to 2% by weight of the reaction mixture. There can be employed benzoyl peroxide, acetyl peroxide, di-t-butylperoxide, azo-bis-isobutyrylnitrile, etc. In addition, U.V. light can be used. Separation of the organohydroxy compound is achieved simultaneously with formation of heterocyclic organosilicon compounds of Formula 2.

In order that those skilled in the art will be better able to practice the invention, the following examples are given by way of illustration and not by way of limitation. All parts are by weight.

EXAMPLE 1

There was added dropwise 108 parts of trimethylchlorosilane to a mixture of 102 parts of allyloxyethanol, 101 parts of triethylamine, and 300 parts of dry benzene while the resulting mixture was refluxed for 2 hours, allowed to cool and then filtered. There was obtained a 90% yield of allyloxyethoxytrimethylsilane having a boiling point of 75° C. at 34 mm. Its identity was confirmed by infrared spectrum.

There was added 21.7 parts of dimethylchlorosilane to a mixture which was heated to 95° C., of 88 parts of allyloxyethoxytrimethylsilane and 500 parts of platinum catalyst, per million parts of mixture. The platinum catalyst employed was a reaction product of chloroplatinic acid and octyl alcohol, as described in Lamoreaux Patent 3,220,972. An exothermic reaction occurred, and the rate of the addition of the dimethylchlorosilane was controlled to moderate the temperature of the reaction. At the termination of the addition, external heat was applied to maintain the reaction temperature between 90° C. to 110° C. The reaction mixture was then stripped of volatiles resulting in the separation of trimethylchlorosilane which was recovered in a trap. There was obtained a 98% yield of product boiling at 34° C. at 28 mm. Based on its infrared spectrum and method of preparation, the product was 2,2-dimethyl-1,6-dioxa-2-sila-cyclooctane of the formula,

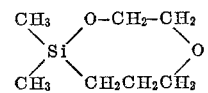

EXAMPLE 2

There was added 39 parts of mercaptoethanol in small increments to a mixture of 65 parts of vinyldimethylethoxysilane and 0.5 part of azo-bis-isobutyrylnitrile. The rate of addition was controlled to maintain the temperature at about 95° C. After the addition had been completed, the mixture was heated for an additional 2 hours at 95° C. The reaction mixture was then fractionated. There was obtained 52 parts of product having a boiling point of 75° C., at 10 mm. Based on its method of preparation and its infrared spectrum, the product was 2,2-dimethyl-1-oxa-2-sila-5-thio-cycloheptane of the formula,

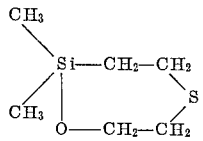

EXAMPLE 3

Equimolar amounts of allyloxyethanol and dimethylchlorosilane are refluxed in toluene until no further evolution of hydrogen chloride is detected. There is obtained allyloxyethoxydimethylsilane.

There is added portionwise 80 parts of allyloxyethoxydimethylsilane to 200 parts of dry toluene at 100° C. containing $2.5 \times 10^{-5}$ moles of platinum, as chloroplatinic acid. An exothermic reaction results during the addition. Towards the termination of the addition, external heat is used to keep the reaction mixture at reflux. It is refluxed for an additional 3 hours. The mixture is then stripped of solvent under reduced pressure and a viscous liquid residue is obtained. The residue is heated at reduced pressure converting it to the product of Example 1.

EXAMPLE 4

A mixture of 80 parts of the heterocyclic organosilicon compound of Example 1 and 1290 parts of dimethyldichlorosilane was added slowly to a slurry of 2500 parts of ice and 1,000 parts of diethyl ether. After the addition was completed, the mixture was heated to reflux with stirring for 10 hours. The organic phase was then separated, dried and then stripped of solvent. There was obtained a viscous liquid whose infrared spectrum showed the presence of hydroxy absorption. Based on its method of preparation, the product was a polydimethylsiloxane having terminal

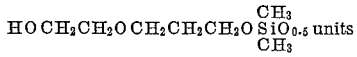

The above procedure is repeated except that 81 parts of the heterocyclic organosilicon compound of Formula 2 is employed in place of the heterocyclic organosilicon compound of Formula 1. There is obtained a polydimethylsiloxane having terminal

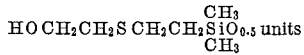

While the foregoing examples have been limited to only a few heterocyclic organosilicon compounds it should be understood that the present invention is broadly directed to heterocyclic organosilicon compounds shown by Formulae 1 and 2. In addition, the foregoing examples have shown only a few of the very many variables which can be employed to produce the aforementioned heterocyclic organosilicon compounds which are specifically described with respect to the hydrosilation method and the free radical method.

What I claim as new and desire to secure by Letters Patent of the United States is:

1. Heterocyclic organosilicon compounds of the formula,

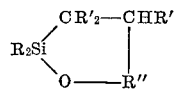

where R is a monovalent radical free of aliphatic unsaturation, and selected from the class consisting of hydrocarbon radicals and halogenated hydrocarbon radicals, R' is selected from the class consisting of hydrogen and R radicals, and R'' is a divalent organic radical selected from the class consisting of alkylene-oxyalkylene and alkylenethioalkylene radicals.

2. A heterocyclic organosilicon compound in accordance with claim 1 of the formula,

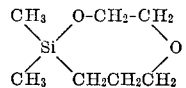

References Cited

UNITED STATES PATENTS

| | | | |
|---|---|---|---|
| 2,983,744 | 5/1961 | Knoth | 260—448.2 XR |
| 2,983,745 | 5/1961 | Speier | 260—448.2 XR |
| 3,083,219 | 3/1963 | Anderson | 260—448.8 |
| 3,193,567 | 7/1965 | Rossmy | 260—448.8 |
| 3,313,837 | 4/1967 | Rossmy et al. | 260—448.8 |

OSCAR R. VERTIZ, Primary Examiner

P. F. SHAVER, Assistant Examiner

U.S. Cl. X.R.

260—2.5, 46.5